United States Patent
Zhou et al.

(10) Patent No.: US 12,248,446 B2
(45) Date of Patent: Mar. 11, 2025

(54) DATA GAP MITIGATION

(71) Applicant: International Business Machines Corporation, Armonk, NY (US)

(72) Inventors: Nianjun Zhou, Chappaqua, NY (US); Dhavalkumar C. Patel, White Plains, NY (US); Emmanuel Yashchin, Yorktown Heights, NY (US); Arun Kwangil Iyengar, Yorktown Heights, NY (US); Shrey Shrivastava, White Plains, NY (US); Anuradha Bhamidipaty, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 17/979,830

(22) Filed: Nov. 3, 2022

(65) Prior Publication Data

US 2024/0152492 A1 May 9, 2024

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2365* (2019.01); *G06F 16/24578* (2019.01);
(Continued)

(58) Field of Classification Search
CPC .............. G06F 16/215; G06F 16/2365; G06F 16/24578; G06F 16/2462; G06F 17/18; G06F 18/15
See application file for complete search history.

(56) References Cited

U.S. PATENT DOCUMENTS

| 9,443,194 B2 | 9/2016 | Chu et al. |
| 9,684,872 B2 | 6/2017 | Dong et al. |

(Continued)

FOREIGN PATENT DOCUMENTS

WO    2022145689 A1    7/2022

OTHER PUBLICATIONS

Erica Tavazzi et al., "Exploiting mutual information for the imputation of static and dynamic mixed-type clinical data with an adaptive k-nearest neighbours approach", BMC Medical Informatics and Decision Making, 2020, 23 pages.
(Continued)

*Primary Examiner* — Diedra McQuitery
(74) *Attorney, Agent, or Firm* — Lilly Neff, Esq.; Kevin P. Radigan, Esq.; Heslin Rothenberg Farley & Mesiti P.C.

(57) ABSTRACT

Disclosed embodiments provide techniques for estimating imputation algorithm performance. Multiple imputer algorithms are selected, and an evaluation of how well each of the imputer algorithms can estimate the missing data is performed. Disclosed embodiments obtain an imputer candidate dataset (ICD). The imputer candidate dataset is compared to the incomplete data range, and a similarity metric is determined between the data range and the ICD. When the similarity metric exceeds a predetermined threshold, an imputer evaluation dataset (IED) is created from the ICD by removing one or more data points from the ICD. Each imputer algorithm is evaluated by applying the IED to it, and computing an imputer evaluation metric based on its performance. The multiple imputer algorithms are ranked based on the imputer evaluation metric. The best ranked imputer algorithm can then be selected for use on the incomplete data range within the measurement dataset.

20 Claims, 16 Drawing Sheets

(51) Int. Cl.
- *G06F 16/23* (2019.01)
- *G06F 16/2457* (2019.01)
- *G06F 16/2458* (2019.01)
- *G06F 17/18* (2006.01)
- *G06F 18/15* (2023.01)

(52) U.S. Cl.
CPC .......... *G06F 16/2462* (2019.01); *G06F 17/18* (2013.01); *G06F 18/15* (2023.01)

(56) References Cited

U.S. PATENT DOCUMENTS

| | | | |
|---|---|---|---|
| 10,733,515 B1* | 8/2020 | Mishra | G06N 5/04 |
| 11,010,365 B2 | 5/2021 | Lee et al. | |
| 11,113,337 B2 | 9/2021 | Bandyopadhyay et al. | |
| 2008/0133275 A1* | 6/2008 | Haug | G16H 50/20 |
| | | | 705/3 |
| 2012/0303410 A1* | 11/2012 | Connors | G06Q 10/087 |
| | | | 705/7.31 |
| 2013/0226842 A1 | 8/2013 | Chu et al. | |
| 2014/0136466 A1* | 5/2014 | Hegazy | G06N 5/048 |
| | | | 706/52 |
| 2017/0372224 A1 | 12/2017 | Reimann | |
| 2019/0294962 A1 | 9/2019 | Vezer et al. | |
| 2019/0391968 A1 | 12/2019 | Zoll et al. | |
| 2021/0182602 A1 | 6/2021 | V et al. | |
| 2021/0304047 A1* | 9/2021 | Alattas | G06N 7/01 |
| 2021/0357781 A1 | 11/2021 | Iyengar et al. | |

OTHER PUBLICATIONS

Nianjun Zhou et al., "A Verifiable Imputation Analysis for Univariate Time Series and Enabling Package", IEEE BigData, Copyright 2020, pp. 1764-1773.

Minseok Lee et al., "Missing-Value Imputation of Continuous Missing Based on Deep Imputation Network Using Correlations among Multiple IoT Data Streams in a Smart Space", Copyright 2019 The Institute of Electronics, Information and Communication Engineers, pp. 289-298.

Neeraj Bokde et al., "A novel imputation methodology for time series based on pattern sequence forecasting", Pattern Recognition Letters, 2018, 24 pages.

Tete Xiao et al., "Region Similarity Representation Learning", Proceedings of the IEEE/CVF International Conference on Computer Vision, 2021, 12 pages.

Stef Van Buuren, "Flexible Imputation of Missing Data", Second Edition, Chapman & Hall/CRC Interdisciplinary Statistics Series, 326 pages.

* cited by examiner

DATA GAP MITIGATION

FIELD

The present invention relates generally to data management, and more particularly, to data gap mitigation.

BACKGROUND

Low-cost sensors, such as Internet-of-Things (IoT) sensors, as well as data from online sources, such as databases, log files, and the like, have created many large datasets with many millions of data points. Data analysis techniques such as numerical analysis, and/or machine learning systems can be used to analyze these large datasets to infer and/or extract meaningful information from the datasets. Analyzing data from sensors, devices, video, logs, transactional applications, as well as web and social media applications, enables data-driven results in near real-time. Businesses, governments, and other enterprises can gain new insights and take appropriate actions based on data analysis. As with most any process, the quality of the output of data analysis depends in large part on the quality of the data input to a data analysis process.

SUMMARY

In one embodiment, there is provided a computer-implemented method for filling data gaps, comprising: identifying a data range within a measurement dataset, wherein the data range is incomplete; obtaining an imputer candidate dataset (ICD) that includes a complete dataset that is representative of the data range; creating an imputer evaluation dataset (IED) from the ICD by removing known values from the ICD; for each imputer algorithm of the plurality of imputer algorithms: applying the imputer algorithm to the IED to obtain an imputer algorithm output (IAO) dataset; computing an imputer evaluation metric for the imputer algorithm based on a comparison between the ICD and the IAO; ranking each imputer algorithm of the plurality of imputer algorithms based on the imputer evaluation metric; and generating a complete data range by applying a high ranked imputer algorithm to the data range.

In another embodiment, there is provided an electronic computation device comprising: a processor; a memory coupled to the processor, the memory containing instructions, that when executed by the processor, cause the electronic computation device to: identify a data range within a measurement dataset, wherein the data range is incomplete; obtain a plurality of imputer algorithms; obtain an imputer candidate dataset (ICD) that includes a complete dataset that is representative of the data range; determine a similarity metric between the data range and the ICD by removing known values from the ICD; in response to the similarity metric exceeding a predetermined threshold: create an imputer evaluation dataset (IED) from the ICD; for each imputer algorithm of the plurality of imputer algorithms: apply the imputer algorithm to the IED to obtain an imputer algorithm output (IAO) dataset; compute an imputer evaluation metric for the imputer algorithm based on a comparison between the ICD and the IAO; rank each imputer algorithm of the plurality of imputer algorithms based on the imputer evaluation metric; and generate a complete data range by applying a high ranked imputer algorithm to the data range.

In another embodiment, there is provided a computer program product for an electronic computation device comprising a computer readable storage medium having program instructions embodied therewith, the program instructions executable by a processor to cause the electronic computation device to: identify a data range within a measurement dataset, wherein the data range is incomplete; obtain a plurality of imputer algorithms; obtain an imputer candidate dataset (ICD) that includes a complete dataset that is representative of the data range; determine a similarity metric between the data range and the ICD by removing known values from the ICD; in response to the similarity metric exceeding a predetermined threshold: create an imputer evaluation dataset (IED) from the ICD; for each imputer algorithm of the plurality of imputer algorithms: apply the imputer algorithm to the IED to obtain an imputer algorithm output (IAO) dataset; compute an imputer evaluation metric for the imputer algorithm based on a comparison between the ICD and the IAO; rank each imputer algorithm of the plurality of imputer algorithms based on the imputer evaluation metric; and generate a complete data range by applying a high ranked imputer algorithm to the data range.

Figure 1:
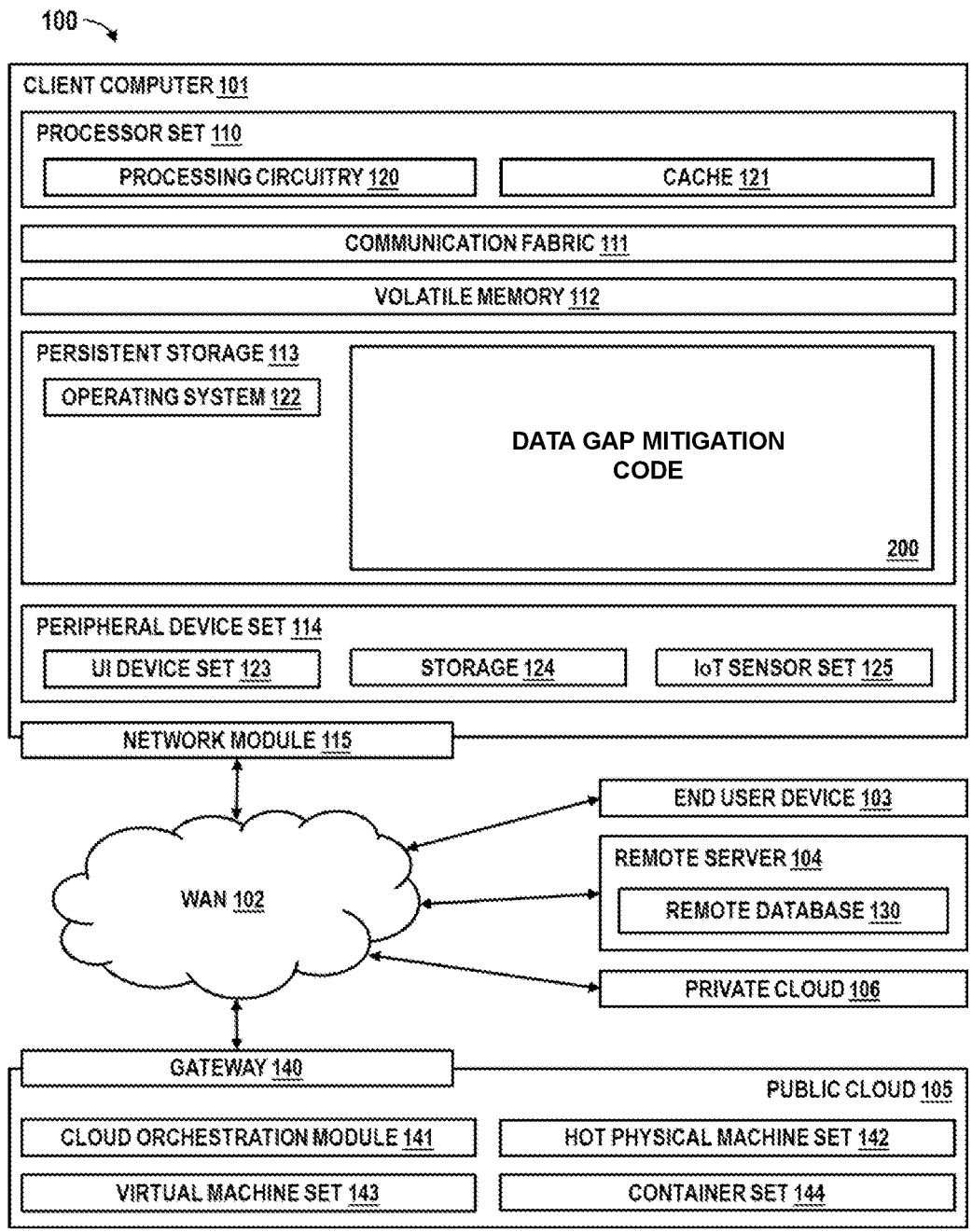
FIG. 1 is an exemplary computing environment in accordance with disclosed embodiments.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

The amount of data generated continues to increase. Machines generate telemetry data via log files and other methods. Sensors, such as IoT sensors often have battery power sources and a small physical form factor. They often use energy-efficient protocols such as Bluetooth® Low Energy (BLE), Zigbee, or other suitable protocol to transmit data to an aggregator such as a data server or other node. These sensors can measure a wide variety of physical phenomena, including meteorological data such as wind, temperature, and precipitation, as well as other environmental data such as noise, vibrations, and light. These sensors can generate many millions of data points each day. Managing all this data from sensors can be a daunting task.

These large data sets can be analyzed to infer information about past events, as well as serve to aid in predicting future events. Machine learning systems and/or numerical analysis techniques utilizing heuristics and/or other techniques can be used to process and/or analyze large, complex datasets. The quality of the output of such systems is related to the quality of the input data to these systems. Invariably, with so many data sources, there are occurrences where a data point is missing and/or unavailable. With sensors, these reasons can include a dead battery, and/or a transient condition, such as temporary radio frequency (RF) interference, computer network connectivity issues, and the like. Missing data can adversely affect data analysis. Imputer algorithms can be used to replace missing data with a reasonable estimated value. Using reasonable estimated values in place of missing data can improve the results of data analysis with machine learning systems and/or numerical analysis techniques. However, different imputer algorithms can have different levels of effectiveness in estimating missing data. This can be a function of the type of data and properties of the datasets that contain missing points. Such properties can include its periodicity, randomness, frequency distributions, burstiness of the data, and so on. Therefore, selecting the best imputer for a given instance of missing data can be an important aspect of improving the technical field of sensor data management.

Disclosed embodiments provide techniques for estimating imputation algorithm performance. A data range is identified within a measurement dataset, where the data range is incomplete, meaning that the data range includes at least one missing point. Multiple imputer algorithms are selected, and an evaluation of how well each of the imputer algorithms can estimate the missing data is performed. Since the actual value of the missing data is unknown, disclosed embodiments obtain an imputer candidate dataset (ICD). The ICD includes a complete dataset that is representative of the data range that has one or more missing data points. The imputer candidate dataset is compared to the incomplete data range, and a similarity metric is determined between the data range and the ICD to determine if the ICD bears sufficient similarity to the incomplete data range so that it can be used for the imputer performance estimation. When the similarity metric exceeds a predetermined threshold, an imputer evaluation dataset (IED) is created from the ICD by removing one or more data points from the ICD, thereby creating one or more "artificial missing" data points. Each imputer algorithm is evaluated by applying the IED to it, and computing an imputer evaluation metric based on its performance. The closer the imputer algorithm is to predicting the value of the artificial missing point(s), the higher the imputer evaluation metric is. The multiple imputer algorithms are ranked based on the imputer evaluation metric. The best ranked imputer algorithm can then be selected for use on the incomplete data range within the measurement dataset. In this way, the quality of data input to data analysis systems is improved, thereby improving the performance of such systems.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows an exemplary computing environment 100 in accordance with disclosed embodiments. Computing environment 100 contains an example of an environment for the execution of at least some of the computer code involved in performing the inventive methods, such as data gap mitigation code block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
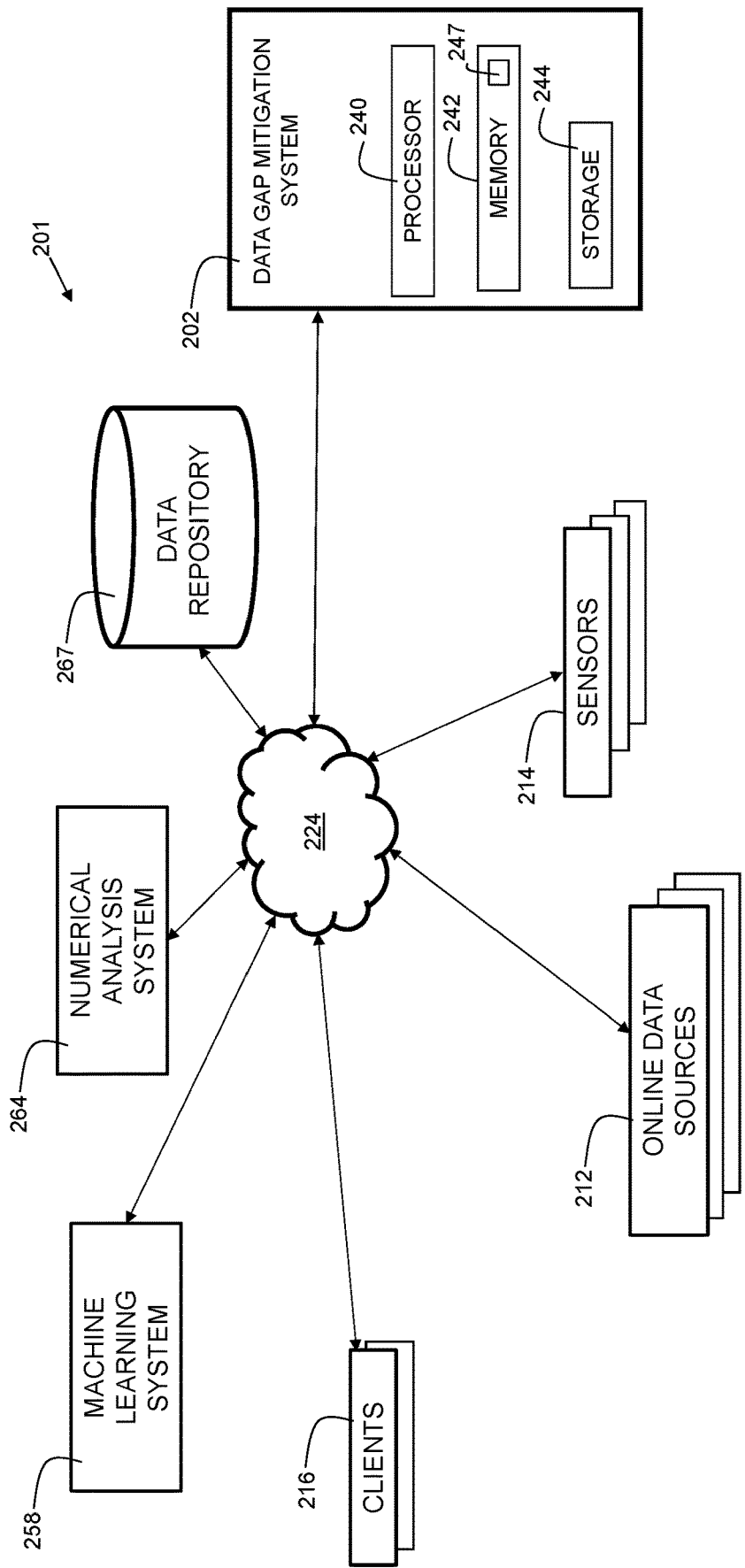
FIG. 2 is an exemplary ecosystem in accordance with disclosed embodiments.

FIG. 2 is an exemplary ecosystem 201 in accordance with disclosed embodiments. Data Gap Mitigation System 202 comprises a processor 240, a memory 242 coupled to the processor 240, and storage 244. System 202 is an electronic computation device. The memory 242 contains program instructions 247, that when executed by the processor 240, perform processes, techniques, and implementations of disclosed embodiments. Memory 242 may include dynamic random-access memory (DRAM), static random-access memory (SRAM), magnetic storage, and/or a read only memory such as flash, EEPROM, optical storage, or other suitable memory and should not be construed as being a transitory signal per se. In some embodiments, storage 244 may include one or more magnetic storage devices such as hard disk drives (HDDs). Storage 244 may additionally include one or more solid state drives (SSDs). The Data Gap Mitigation System 202 is configured to interact with other elements of ecosystem 201. Data Gap Mitigation System 202 is connected to network 224, which can be the Internet, a wide area network, a local area network, and/or another suitable network.

Ecosystem 201 can include one or more online data sources 212. The online data sources can include financial data sources, meteorological data sources, geopolitical data sources, and/or other suitable data sources. The online data sources can be data feeds provided to Data Gap Mitigation System 202 via HTTP (Hypertext Transfer Protocol) and/or other suitable protocols.

Ecosystem 201 can include one or more sensors 214. The sensors can include IoT sensors. The sensors 214 can measure a wide variety of parameters, including, but not limited to, temperature, water level, moisture, light, motion, acceleration, mechanical strain, ambient gasses, smoke, magnetic fields, radio signals, and/or noise levels. In embodiments, there can be many thousands of such sensors, each capable of generating many thousands of data points daily.

Ecosystem 201 may include one or more client devices, indicated as 216. Client device 216 can include a laptop computer, desktop computer, tablet computer, smartphone, and/or other suitable computing device. Client device 216 may be used to configure Data Gap Mitigation System 202, including features such as identifying input data sources, selecting imputation algorithms for evaluation, output data storage locations, and/or configuring/executing other features for disclosed embodiments.

Ecosystem 201 may include machine learning system 258. The machine learning system 258 can include, but is not limited to, a convolutional neural network (CNN), Support Vector Machine (SVM), Decision Tree, Recurrent Neural Network (RNN), Long Short Term Memory Network (LSTM), Radial Basis Function Network (RBFN), Multilayer Perceptron (MLP), and/or other suitable neural network type. In embodiments, the machine learning system 258 is trained using supervised learning techniques.

Ecosystem 201 may include numerical analysis system 264. Numerical analysis system 264 may include one or more computers for processing large datasets using mathematical and/or heuristic techniques. The numerical analysis system 264 may execute instructions in Python, C, C++, Go, Hadoop, and/or other suitable programming language and/or programming framework for processing datasets. In embodiments, the numerical analysis system 264 can perform operations, including, but not limited to, statistical analysis, histogram generation, curve fitting, linear regressions, interpolation, extrapolation, differential equations, and/or other suitable operations, for the purposes of analyzing input data.

Ecosystem 201 may include data repository 267. Data repository 267 may include one or more storage devices, and or database repositories. The database repositories can include SQL databases, and/or other suitable database schemas and/or storage formats. The data repository 267 may include raw data. The raw data is data received from sensors 214 and/or online data sources 212. The raw data can include one or more missing data points, referred to as "missings." The missings can be caused by malfunctions or temporary offline status in one or more sensors 214. The data repository 267 may also include conditioned data. Conditioned data is created by applying raw data as input to an imputer algorithm. The imputer algorithm creates estimates for the missing data points, and the raw data is combined with the estimates for the missings to create the conditioned data. The conditioned data can then be applied to the machine learning system 258 and/or numerical analysis system 264, to enable improved input data quality, which can result in improved output data quality from machine learning system 258 and/or numerical analysis system 264.

Figure 3:
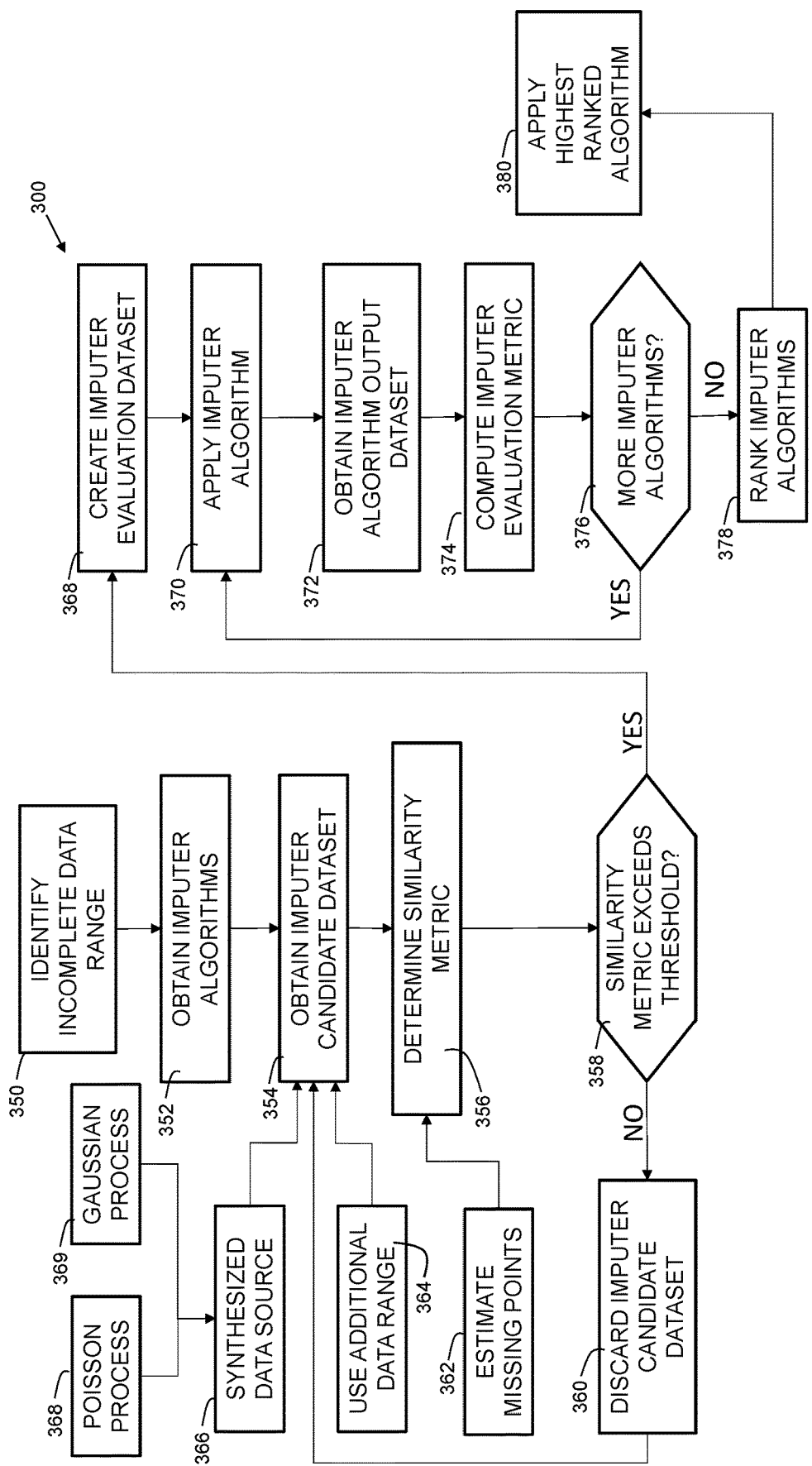
FIG. 3 is a flowchart indicating process steps for embodiments of the present invention.

FIG. 3 is a flowchart 300 indicating process steps for embodiments of the present invention. At 350, an incomplete data range is identified. In some embodiments, the data can be periodic data, such as hourly or daily data. In embodiments, the data range can include data from one or more IoT sensors (see 125 of FIG. 1). An incomplete data range is a data range for which there is at least one missing data point. As an example, for data with one daily value, there are 31 values for the month of July so long as no data points are missing. If, for example, the data point for July 17 is unavailable, due to a temporary sensor and/or network outage, then there are less than 31 data points for July, and as such, the data range corresponding to the month of July is deemed as incomplete. Rather than have no data point for July 17, it can be preferable to use an imputer algorithm to estimate a value for July 17 in order to provide more complete input data to data analysis systems.

At 352, a plurality of imputer algorithms are obtained. At 354, an imputer candidate dataset (ICD) is obtained. The ICD is a dataset that bears mathematical similarity to the incomplete data range, but without any missing points. In some embodiments, an ICD is considered mathematically similar to an incomplete data range based on Euclidean distance, Jaccard similarity, Minkowski distance, or other suitable technique. In some embodiments, the ICD is obtained by using an additional data range 364. These embodiments may be well-suited for periodic data. Continuing with the example of daily data for the month of July being missing at one or more points, the additional data range can be for the previous month, or for July of the previous year, as examples. In other words, the ICD can be obtained from another location within the same dataset as the data range that contained the missing data. In embodiments, the Data Gap Mitigation System 202 may scan previous data points to identify a similar data pattern elsewhere within the same data set that does not have any missing data points, and use that identified similar data pattern as the ICD. Thus, in embodiments, the imputer candidate dataset comprises a second data range within the measurement dataset. In other embodiments, the ICD is obtained by using a synthesized data source 366. The synthesized data source 366 can be a data set generated by a mathematical process such as a Poisson process 368 or Gaussian process 369. Thus, in embodiments, the imputer candidate dataset is comprised of synthesized data. In some embodiments, the synthesized data is generated from a Gaussian process. In some embodiments, the synthesized data is generated from a Poisson process.

At 356, a similarity metric is determined between the imputer candidate dataset obtained at 354, and the incomplete data range obtained at 350. In embodiments, the similarity metric can be obtained using Euclidean distance, Jaccard similarity, Minkowski distance, or other suitable technique. In some embodiments, the value of the missing data in the incomplete data range obtained at 350 may be estimated at 362. This estimate can be based on feature similarity, averaging, or other suitable technique. Thus, embodiments can include estimating missing datapoints within the identified data range prior to determining the similarity metric.

At 358, a check is made to determine if the similarity metric exceeds a predetermined threshold. If no at 358, then the ICD obtained at 354 is deemed to not be sufficiently similar to the incomplete data range at 350, and it is discarded at 360. After 360, the process can return to 354 where a new ICD can be obtained, and the process can repeat until a suitable ICD is obtained.

If yes at 358, the process continues to 368 where an imputer evaluation dataset (IED) is generated. The IED is based on the ICD obtained at 354, but with some data points removed. These removed points are referred to as "artificial missings." Embodiments can use one or more artificial missings. At 370, an imputer algorithm selected from the imputer algorithms obtained at 352, is applied to the IED, which produces an imputer algorithm output (IAO) dataset at 372. The IAO includes an estimate for the artificial missings. Since the actual value of the artificial missings is known from the ICD obtained at 354, the efficacy of a particular imputer algorithm on the IED can be accurately evaluated. Since the IED is derived from the ICD, and the ICD is deemed to be similar to the incomplete data range obtained at 350 (which contains the actual missing, of which the true value is unknown), an imputer algorithm that performs well on the IED has a high likelihood of performing well on the incomplete data range that contains the actual missing value(s).

At 374, an imputer evaluation metric is computed. To accomplish this, the IED is provided to each of a plurality of imputer algorithms. Each of these imputer algorithms is designed to evaluate a dataset and to generate conditioned data that replaces any missings. Different imputer algorithms can be designed to accomplish this task in different ways. For example, different imputer algorithms can include imputation using mean values, median values, zero values, constant values, most frequent values, and/or other suitable techniques. Some imputer algorithms can include a k nearest neighbors (k-NN) approach to use feature similarity to predict the values of missing data points. Some imputer algorithms can include a Multivariate Imputation by Chained Equation (MICE) technique. Some imputer algorithms may utilize stochastic regression techniques, extrapolation, and/or interpolation. Each of the aforementioned algorithms may perform better in some circumstances than in others. Disclosed embodiments evaluate multiple imputer algorithms to identify one that performs best for a given incomplete data range.

In any case, since the true value of an artificial missing in the IED provided to the imputer algorithms is known, the true value can be compared with the value provided by each imputer algorithm. The closeness of the two values is indicative of how well the imputer algorithm performed on the IED, and good performance of the imputer algorithm on the IED may be indicative of similar performance of the imputer algorithm on the incomplete data range that was obtained at 350. In embodiments, computing the imputer evaluation metric comprises computing a mean, mean square error, and/or mean absolute error. In embodiments, computing the imputer evaluation metric comprises computing any acceptable performance measurement.

At 376, a check is made to determine if there are additional imputer algorithms to check. If additional algorithms remain, the process returns to 370. If no at 376, the process continues to 378 where the imputer algorithms are ranked. In some embodiments, the highest ranked algorithm is applied at 380. Some embodiments may include additional ranking criteria, including processing time for the imputer algorithm, and/or computing resources required to execute the imputer algorithm. The computing resources can include memory, network utilization, and/or processing cycles. Thus, disclosed embodiments can improve the technical field of sensor data management by qualifying an imputer algorithm based on specific occurrences of missing data, and applying the qualified imputer algorithm on a data range basis to achieve optimal data estimation for each data range that contains missing data points.

Figure 4A:
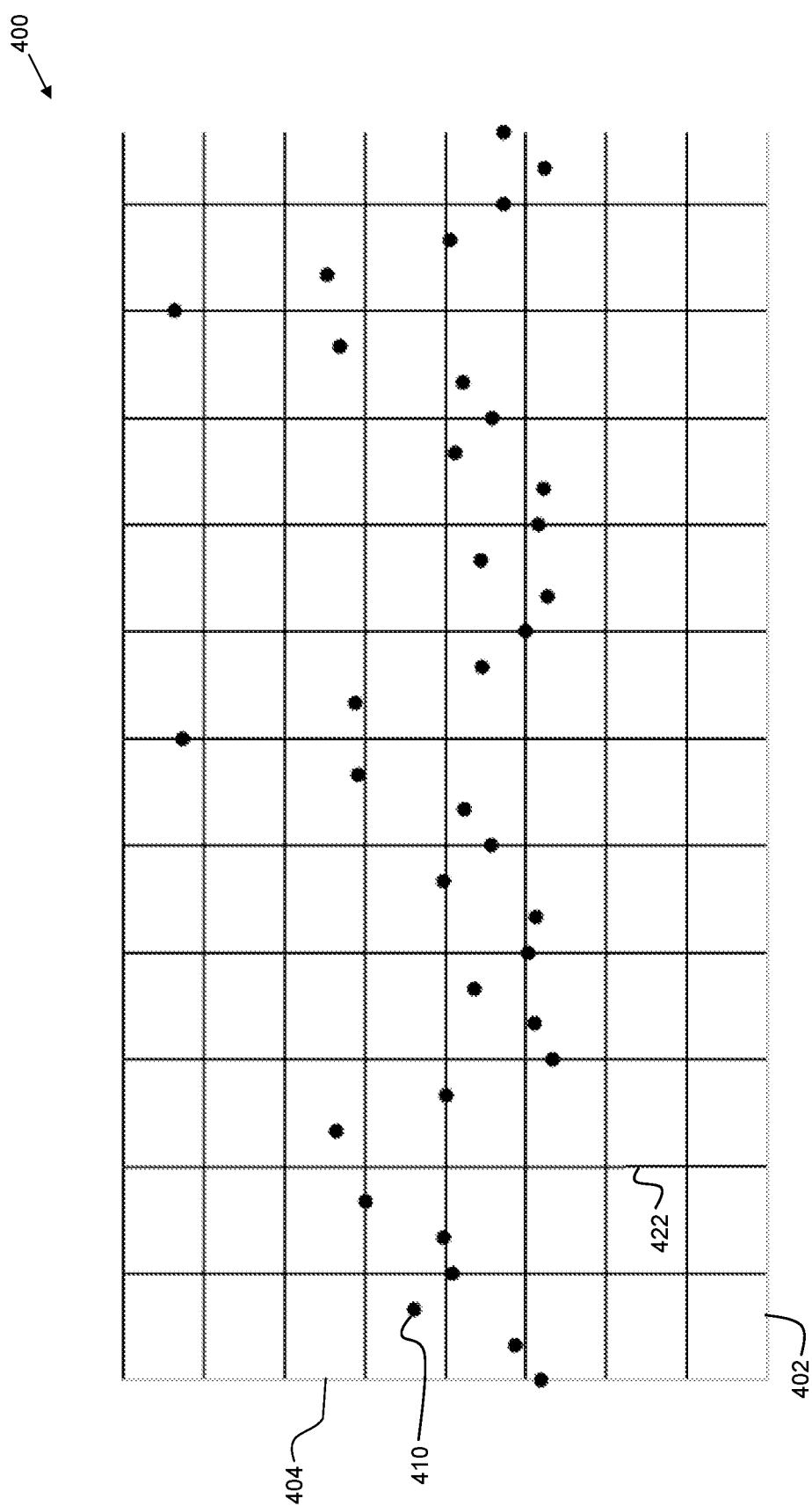
FIG. 4A shows an example of an incomplete dataset.

FIG. 4A shows an example of an incomplete dataset 400. Dataset 400 includes a plurality of data points, indicated generally at 410 (as a dark circle). Dataset 400 is plotted against a horizontal axis 402, and vertical axis 404. The units of the horizontal axis and vertical axis are not critical, as disclosed embodiments can be used with a wide variety of types of data. As an example, the horizontal axis 402 can be a time axis, such as days, weeks, etc., and vertical axis 404 can be a value, such as an amount of rainfall, a temperature reading, etc. As no data point exists on the vertical line indicated by 422, that is a "true missing" data point. A true missing data point is a data point for which the actual value is unknown. Continuing with the example of a daily temperature reading, the horizontal axis 402 represents days, and on the day corresponding to the vertical line indicated by 422, the temperature sensor was off line, and thus, this is a true missing, as the actual temperature for that day is not available.

Figure 4B:
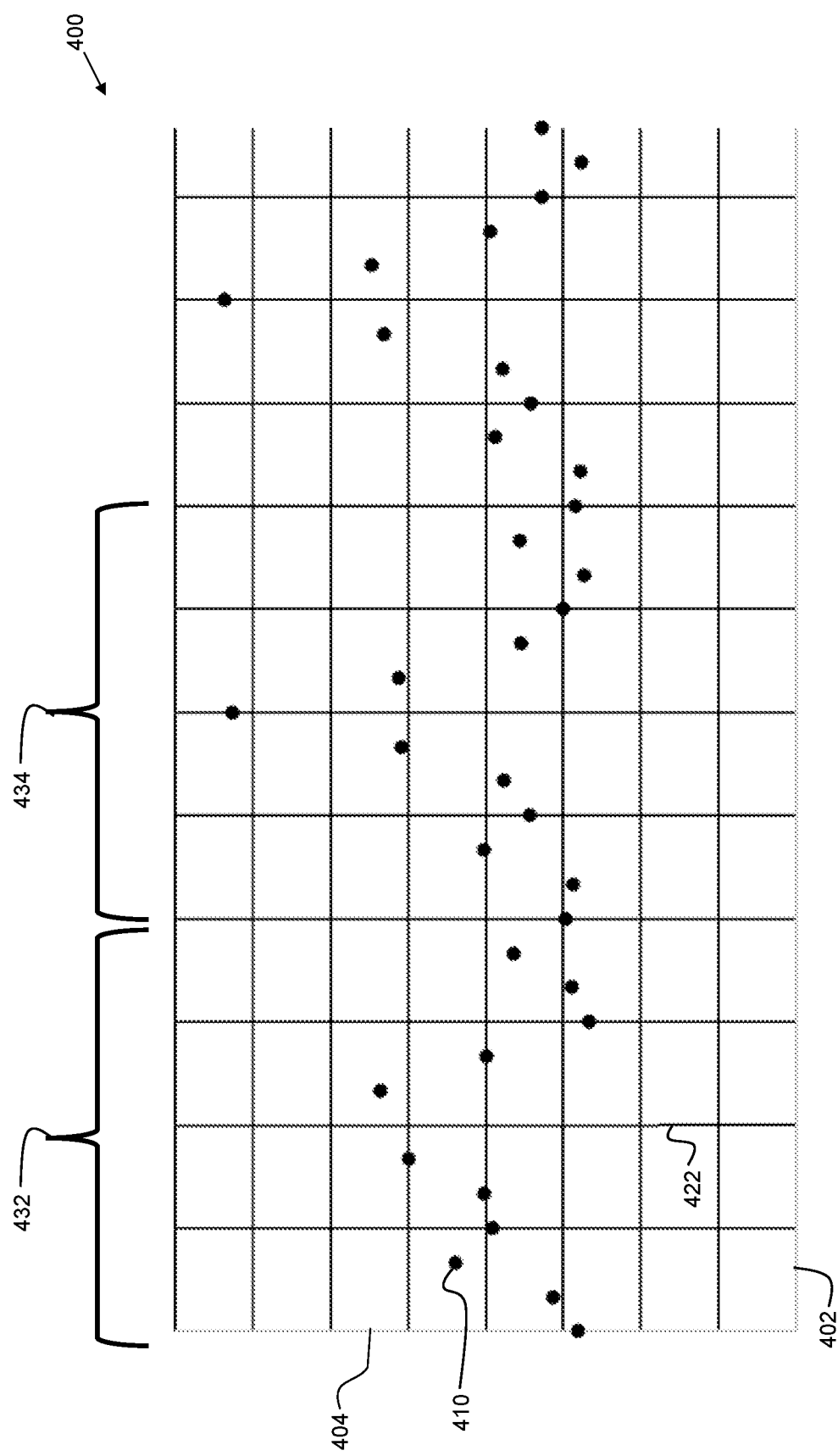
FIG. 4B indicates multiple data ranges within the dataset of FIG. 4A.

Referring now to FIG. 4B, two data ranges within the dataset are designated. Data range 432 contains the true missing, indicated at 422, and thus, data range 432 is an incomplete data range. Data range 434 is complete, as it does not contain any missing points. In embodiments, data range 434 can be used as an imputer candidate dataset (ICD) for selecting an imputer algorithm to estimate a value for the true missing indicated at 422.

Figure 5A:
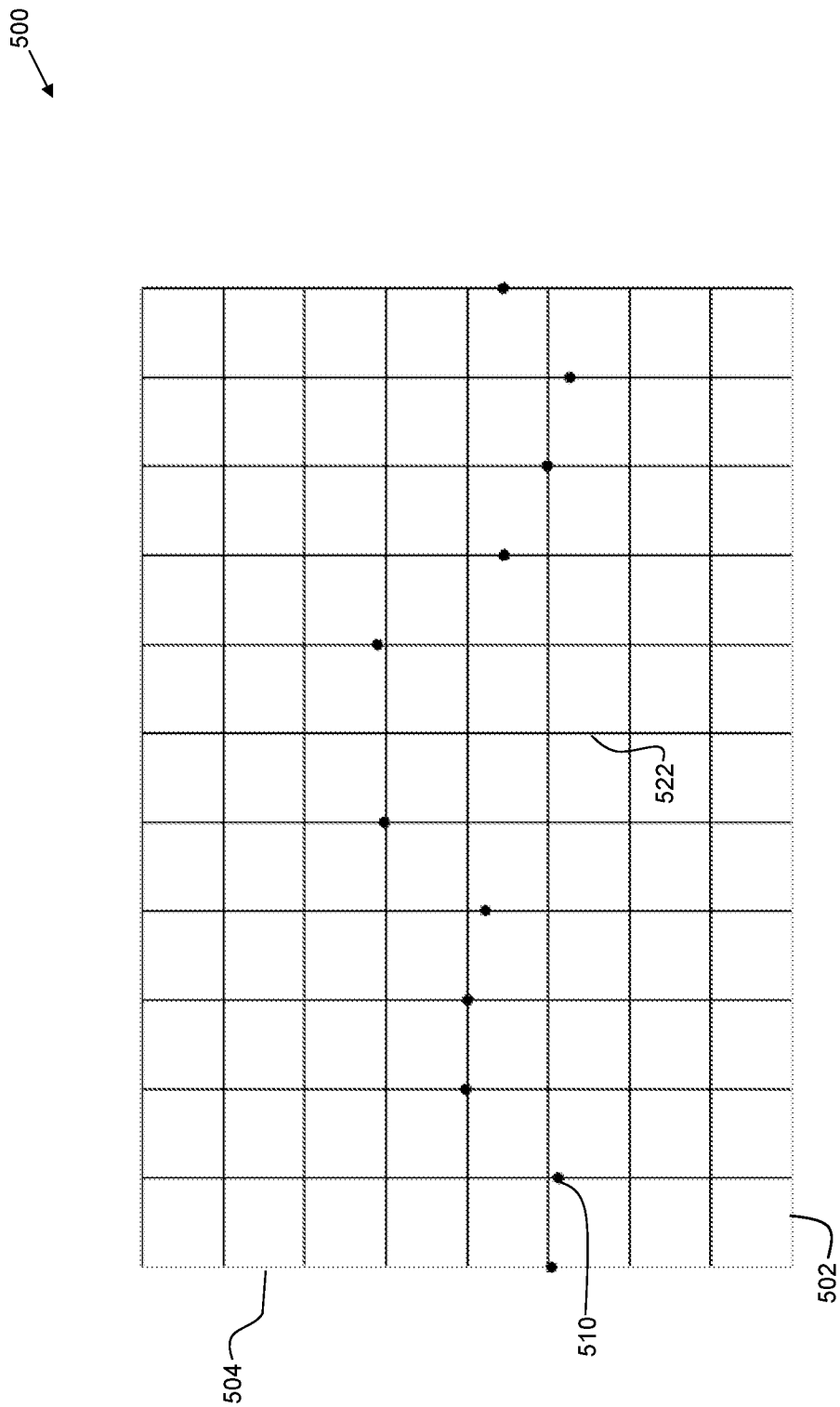
FIG. 5A shows a data range with a missing point.
Figure 5B:
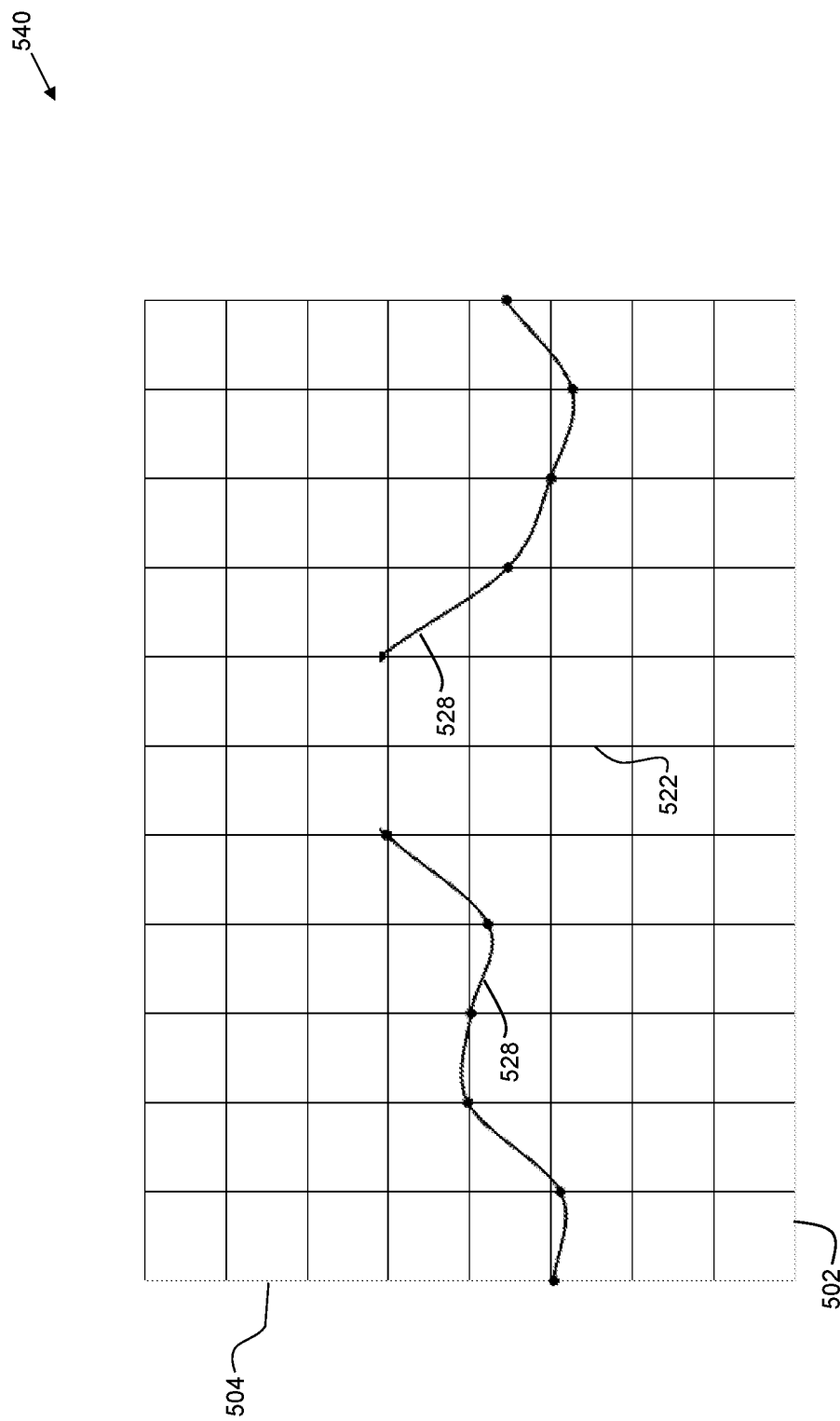
FIG. 5B shows the data range of FIG. 5A with curve fitting for feature selection.

FIG. 5A is a graph 500 of a data range with a missing point, indicated at 522. The data range includes a plurality of data points, indicated generally at 510 (as a dark circle). The graph 500 includes a horizontal axis 502, and vertical axis 504. The value of the missing point is unknown. Had it been available, it would have been rendered somewhere along the line indicated at 522. Thus, it is a true missing, such as what occurs if an IoT sensor is temporarily offline or unreachable. In embodiments, identifying a data range comprises identifying a data range with one missing point. FIG. 5B is a graph 540 showing the data range of FIG. 5A with curve fitting for feature selection. A curve, shown as 528 is rendered that connects consecutive data points. Sections of the curve 528 can be analyzed to derive a coarse estimate for the missing data point at 522.

Figure 5C:
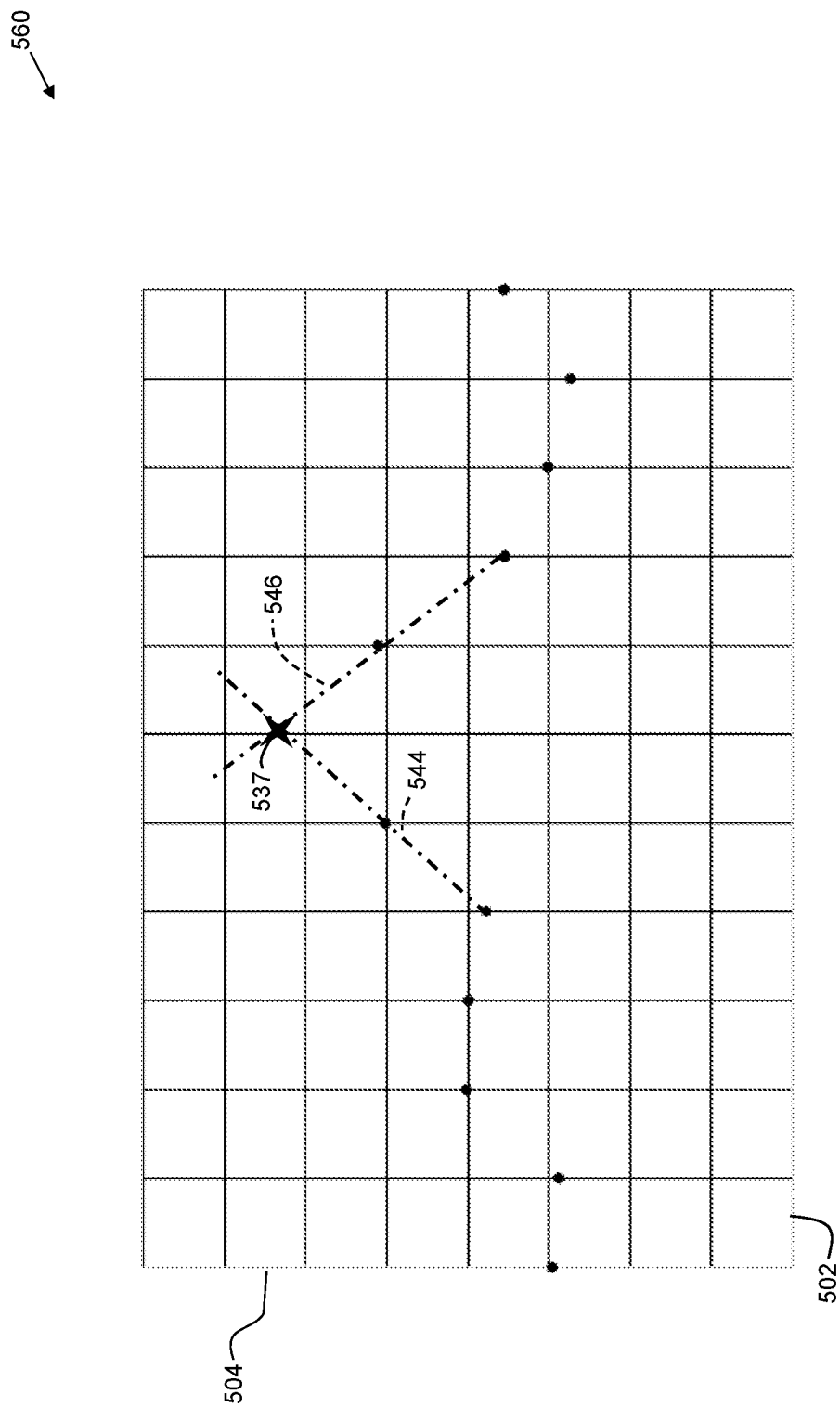
FIG. 5C shows the data range of FIG. 5A with a seed point based on feature selection in accordance with embodiments of the present invention.
Figure 5D:
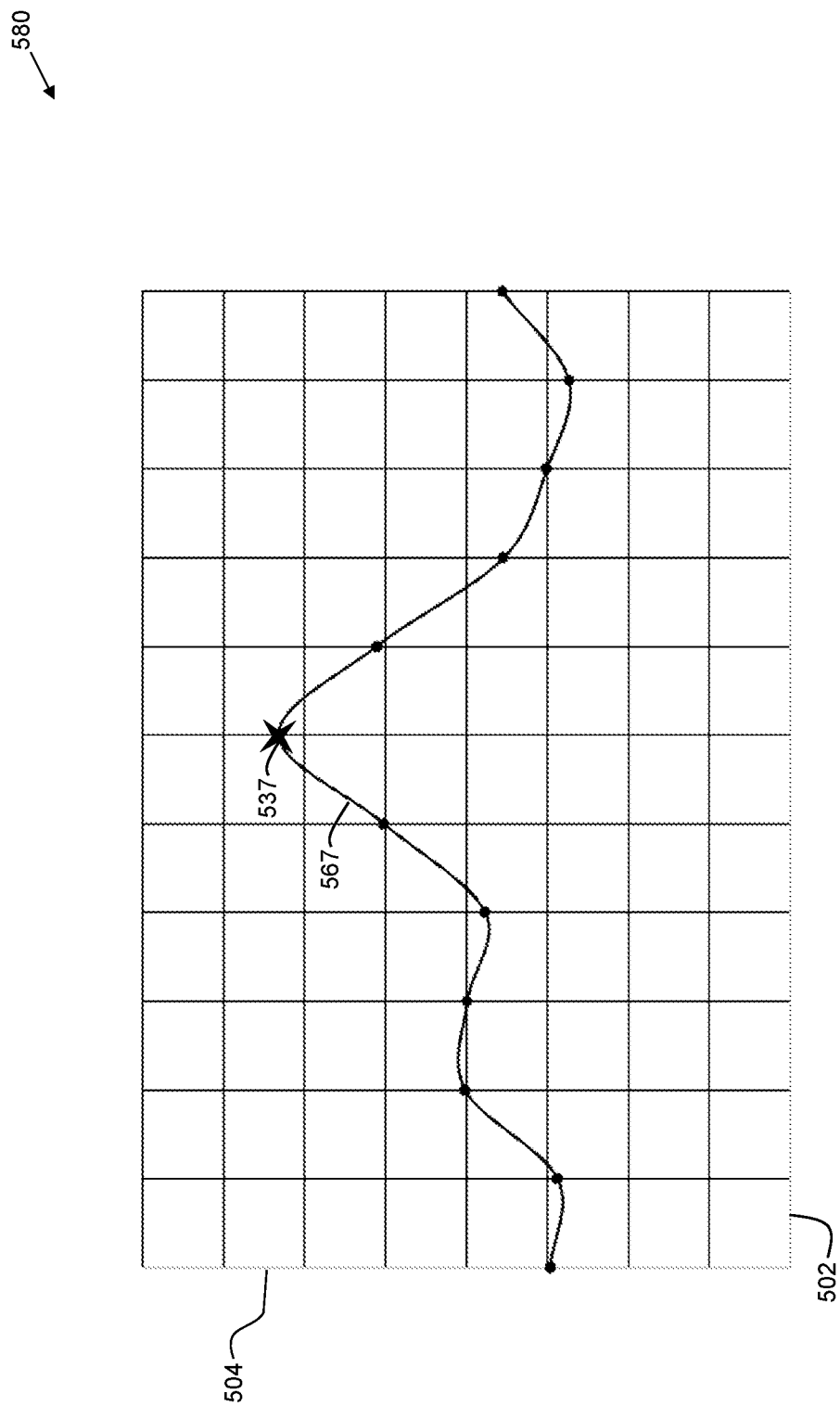
FIG. 5D shows the data range of FIG. 5A with the seed point and curve fitting for determining a similarity metric in accordance with embodiments of the present invention.

FIG. 5C is a graph 560 showing the data range of FIG. 5A with a seed point 537 based on feature selection in accordance with embodiments of the present invention. In embodiments, one or more features of curve 528 of FIG. 5B is selected for estimation of the missing point. Examples can include linear slopes from an actual line or line of best fit for subsets of data points. As shown in FIG. 5C, a first line, indicated at 544 intersects with a second line, indicated at 546. The point of intersection of line 544 and line 546 is the location of seed point 537. Seed point 537 can be added to the data range for the purposes of serving as a coarse estimate for comparing the data range with true missing data to other ICDs, enabling a more accurate similarity assessment. Embodiments can include performing a feature selection process prior to determining the similarity metric. In this example, a first feature includes a monotonically increasing shape, corresponding to line 544, followed by a second feature of an adjacent monotonically decreasing shape, corresponding to line 546. FIG. 5D is a graph 580 of the dataset of FIG. 5A with the seed point 537 and curve 567 for determining a similarity metric in accordance with embodiments of the present invention.

Figure 6:
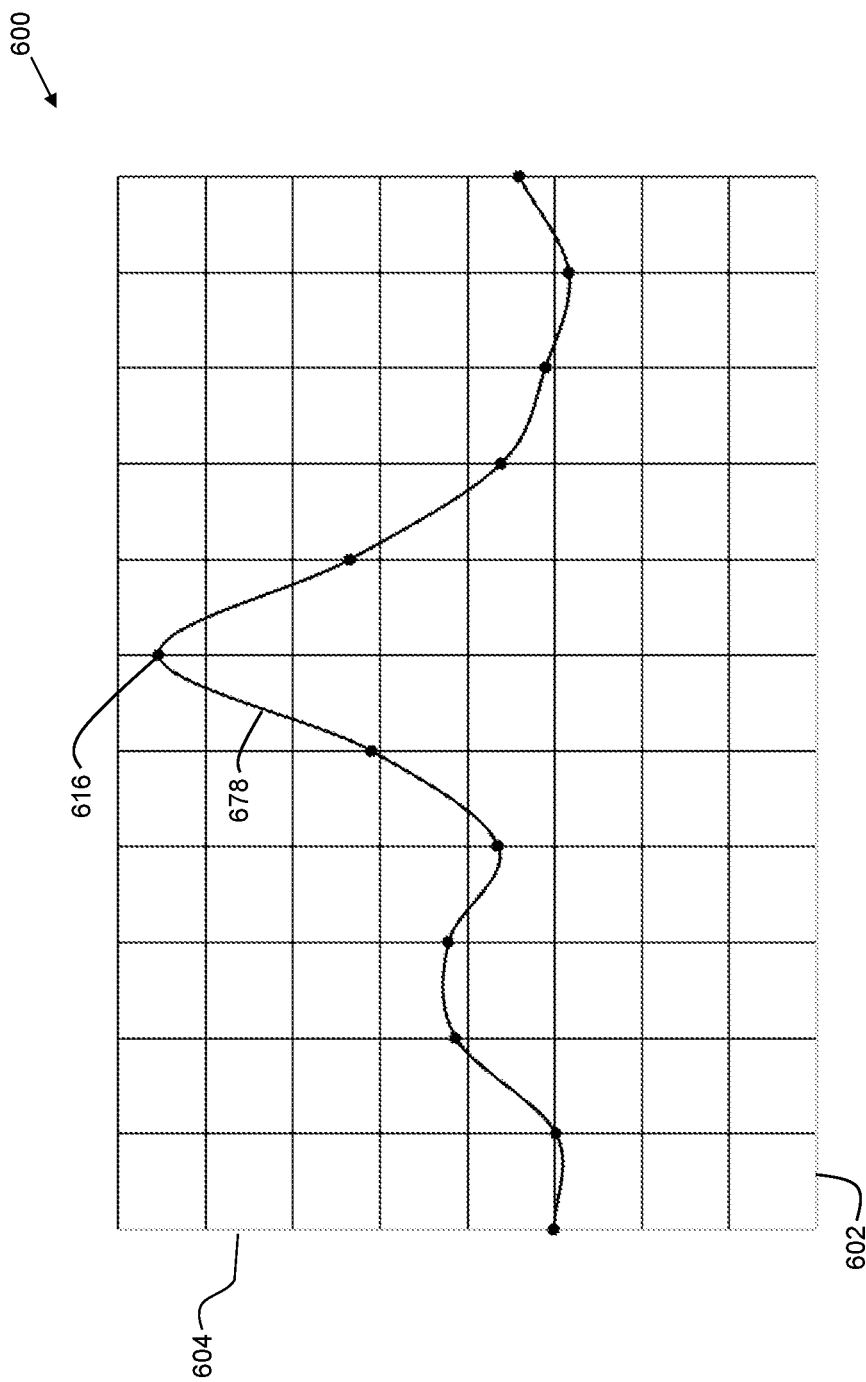
FIG. 6 shows an additional data range.

FIG. 6 is a graph 600 of an additional data range, having curve 678 that connects consecutive data points. The graph 600 includes a horizontal axis 602, and vertical axis 604. In embodiments, curve 678 can be compared with curve 567 of FIG. 5D that contains seed point 537. If curve 678 is deemed sufficiently similar to curve 567, then the data shown in FIG. 6 can serve as an ICD for imputer algorithm evaluation for estimating the missing point at 522 of FIG. 5A. To create an IED from the ICD, one or more data points will be removed to create artificial missings. As an example, data point 616 can be removed to create an artificial missing at that location along the horizontal axis 602.

Figure 7:
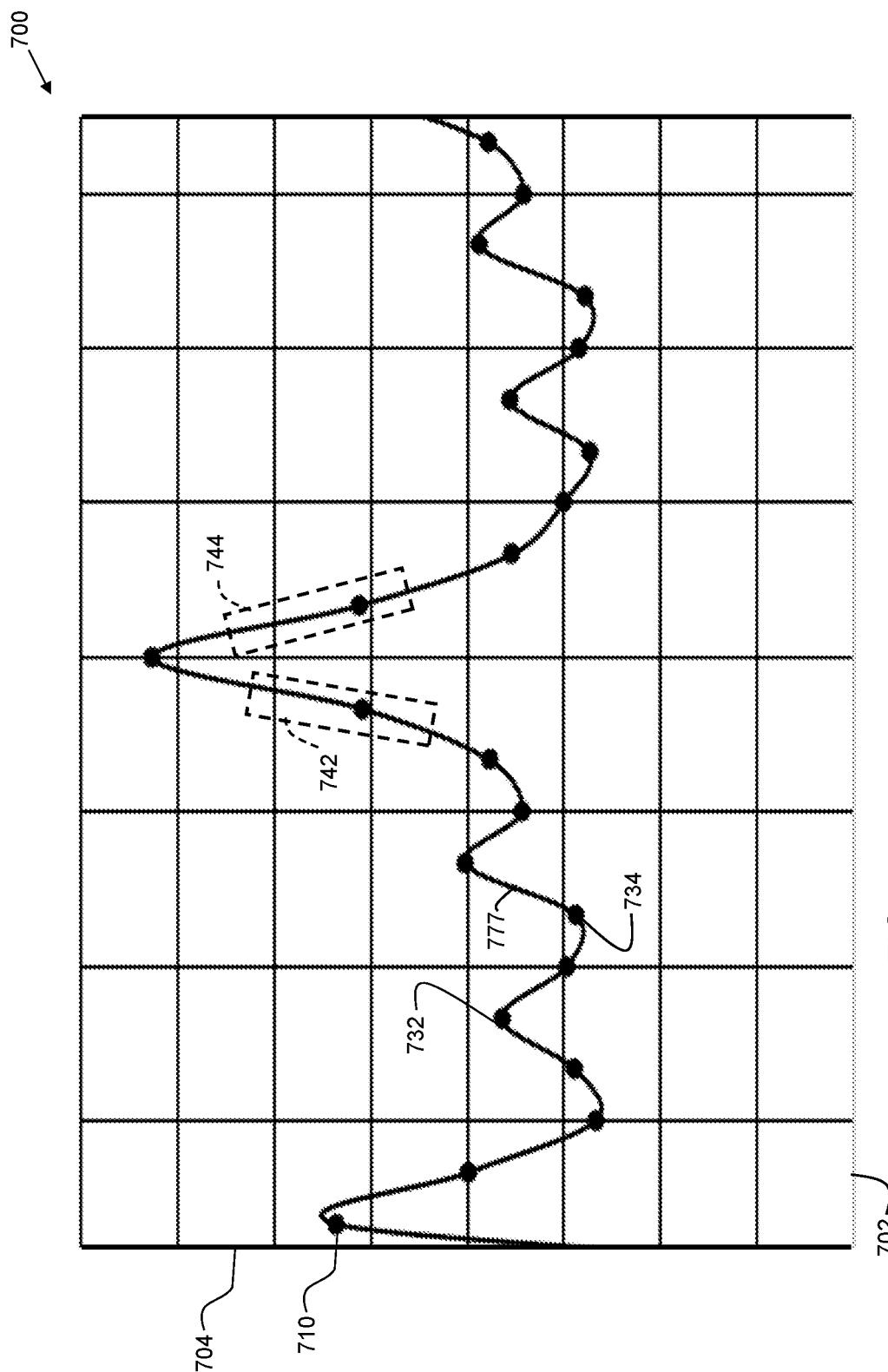
FIG. 7 shows examples of feature selection shapes in accordance with embodiments of the present invention.

FIG. 7 is a graph 700 that shows examples of feature selection shapes in accordance with embodiments of the present invention. The graph 700 includes a horizontal axis 702, and vertical axis 704. Graph 700 includes multiple data points, indicated generally at 710, connected by a curve 777. Graph 700 includes a local maximum 732 and a local minimum 734. Graph 700 also includes a monotonically increasing region 742 and a monotonically decreasing region 744. These, and other shapes can be used for feature selection. In embodiments, the feature selection process includes shape identification. In embodiments, the shape identification includes identifying a monotonically increasing shape, monotonically decreasing shape, local maximum, and/or local minimum. In some embodiments, the shapes can be identified by computing a first derivative and/or second derivative of curve 777 and identifying critical numbers, inflection points, and/or relative minima and maxima. In embodiments, the shape identification includes identifying a geographic curve or surface shape, for example, local maxima or minima or a saddle point.

Figure 8:
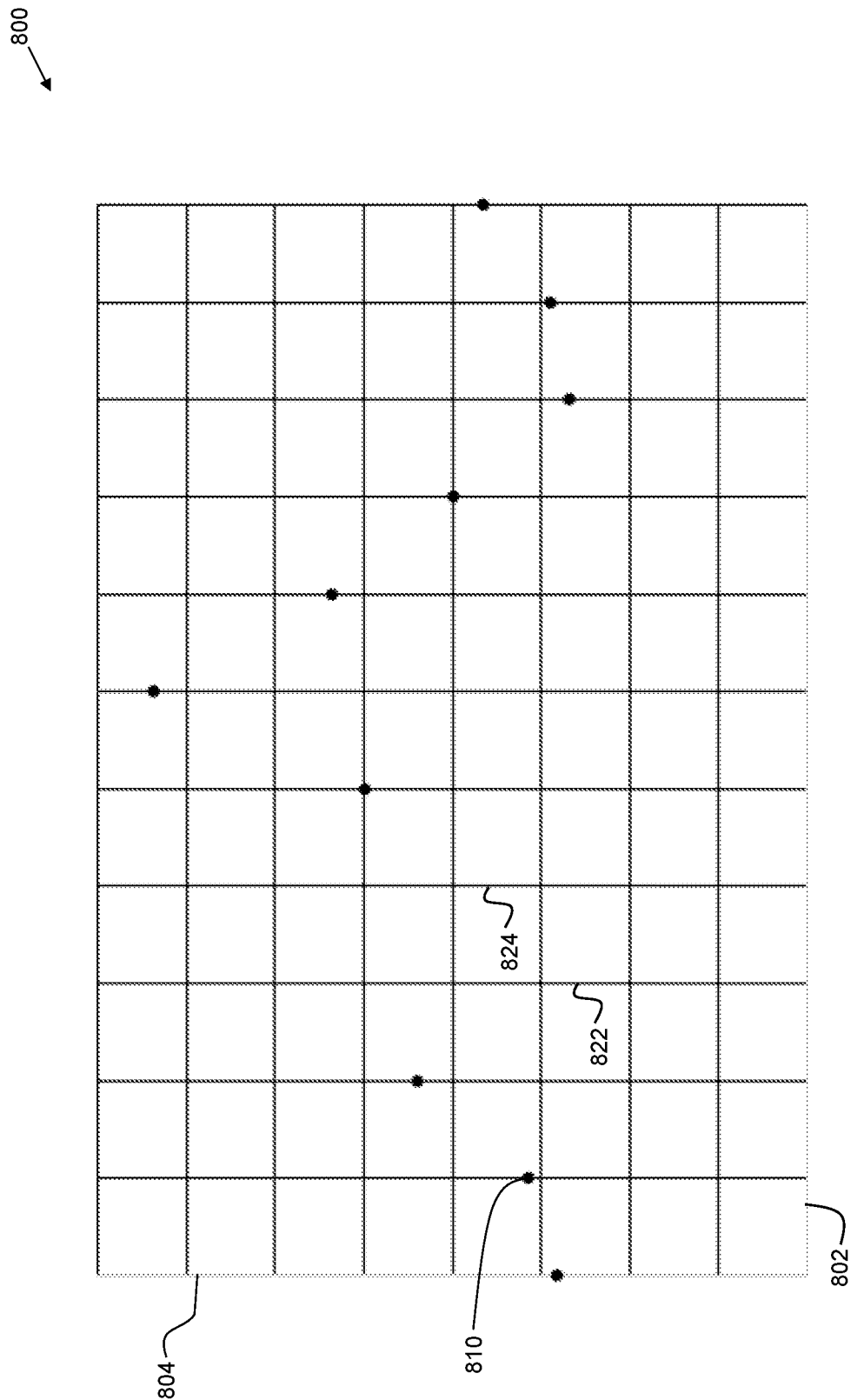
FIG. 8 shows an example of a data range with consecutive missing data points.

FIG. 8 is a graph 800 that shows an example of a data range with consecutive missing data points. The graph 800 includes a horizontal axis 802, and vertical axis 804. Data points are indicated generally as 810 (as a dark circle). The missing data points are indicated at 822 and 824. As can be seen, there are no data points (circles) on lines indicated at 822, and 824, and there are no data points between the two missing points. In embodiments, identifying a data range comprises identifying a data range with multiple missing points. In embodiments, the multiple missing points are consecutive.

Figure 9:
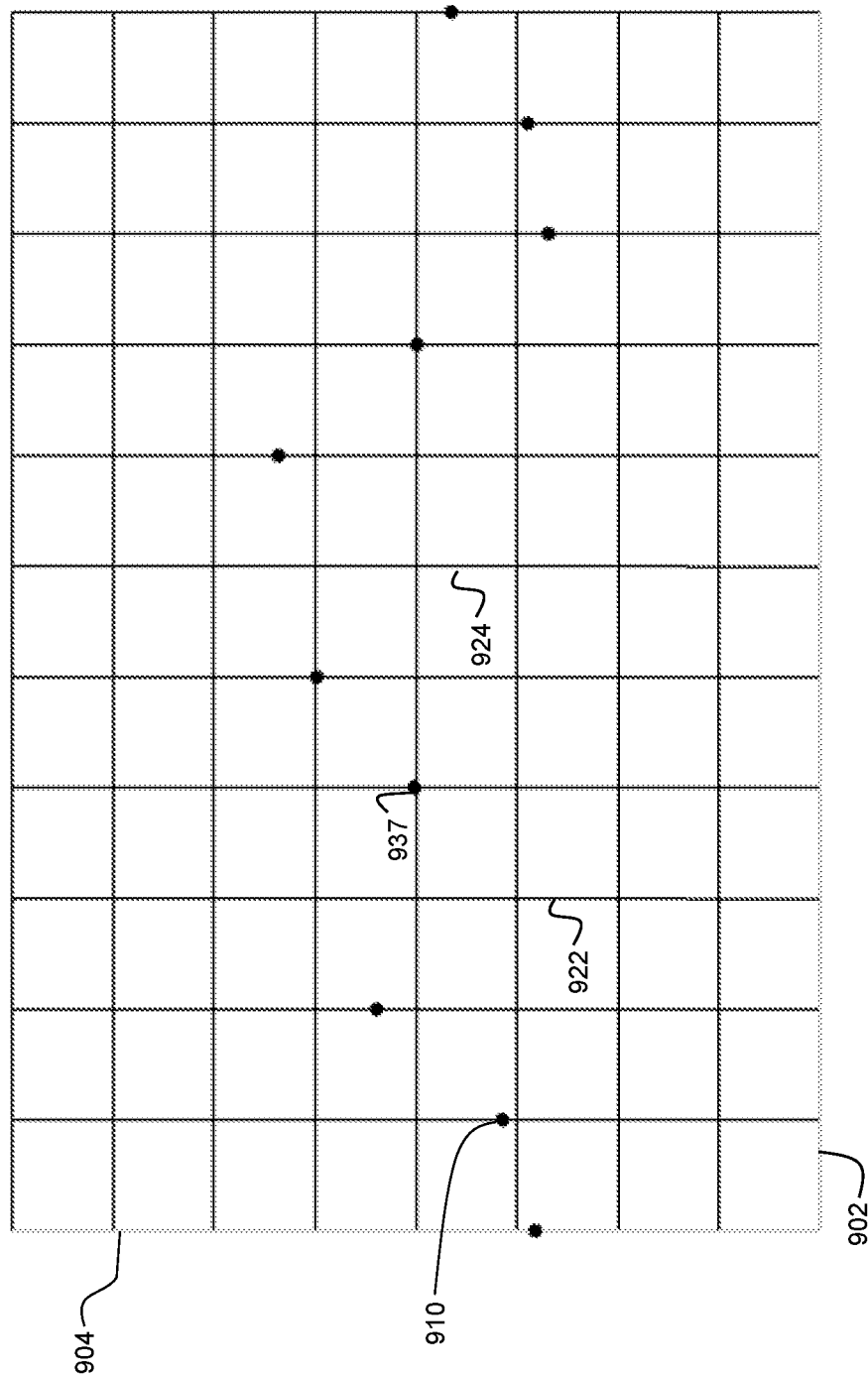
FIG. 9 shows an example of a data range with nonconsecutive missing data points.

FIG. 9 is a graph 900 that shows an example of a data range with nonconsecutive missing data points. The graph 900 includes a horizontal axis 902, and vertical axis 904. Data points are indicated generally as 910 (as a dark circle). The missing data points are indicated at 922 and 924. As can be seen, there are no data points (circles) on lines indicated at 922, and 924, and there is at least one data point, indicated at 937, disposed between the two missing points. In embodiments, the multiple missing points are nonconsecutive.

Figure 10:
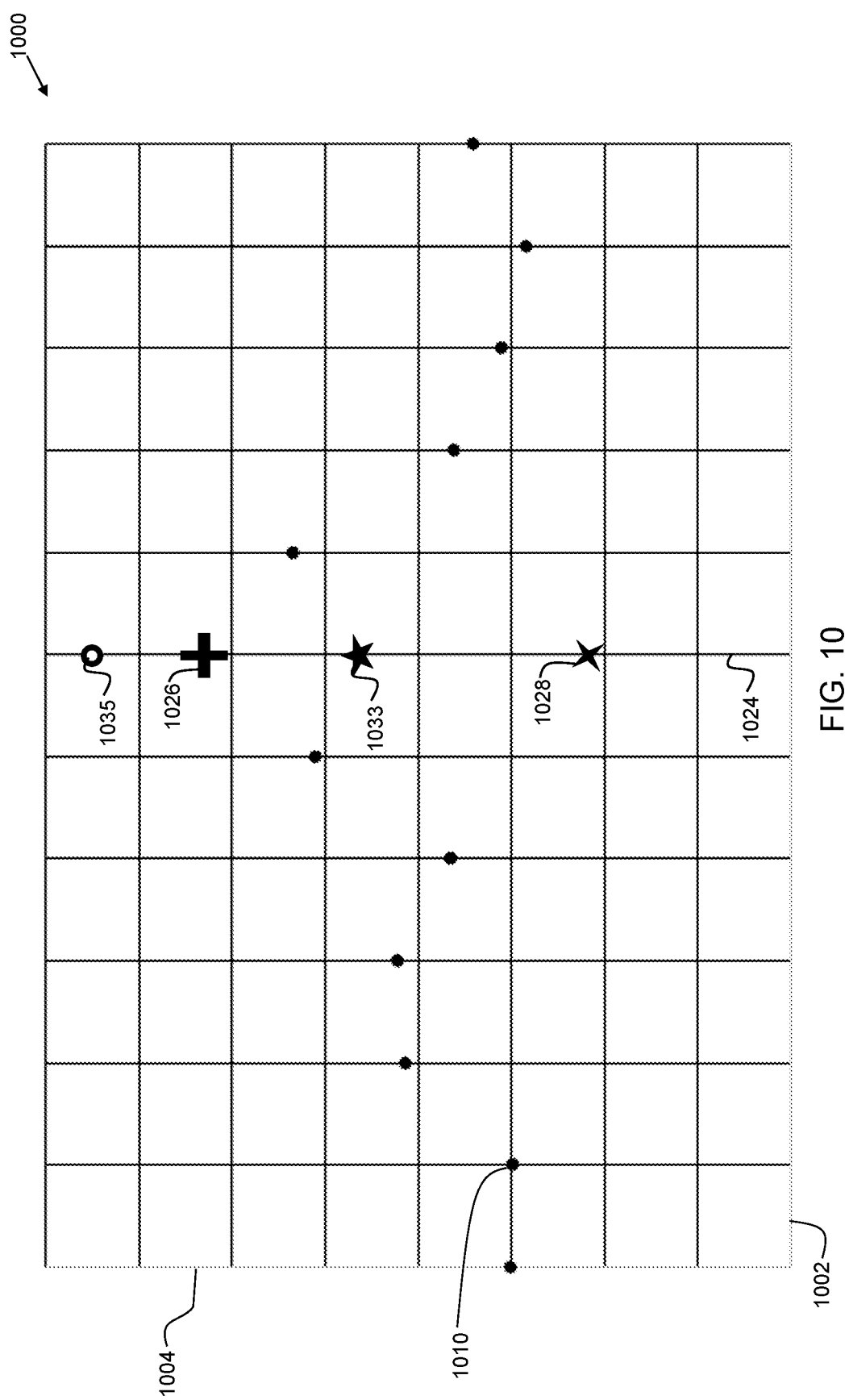
FIG. 10 is a graphical example showing imputer algorithm evaluation.

FIG. 10 is a graph 1000 showing an example of imputer algorithm evaluation. The graph 1000 includes a horizontal axis 1002, and vertical axis 1004. Data points are indicated generally as 1010 (as a dark circle). Graph 1000 shows an imputer evaluation dataset (IED), based on the ICD shown in FIG. 6. In graph 1000, the data point 616 (FIG. 6) is removed, to create an artificial missing, indicated graphically at 1035. When the data shown in graph 1000 is input to an imputer algorithm, no data is included along the vertical line 1024. Thus, the data shown in graph 1000 is input to imputer algorithms with artificial missing data. The correct value for this artificial missing is indicated as 616 in FIG. 6. In the example shown, three imputer algorithms are used. A first imputer algorithm makes an estimate at data point 1026, a second imputer algorithm makes an estimate at data point 1028, and a third imputer algorithm makes an estimate at data point 1033. Each of the imputer generated points (1026, 1028, and 1033) comprise an imputer algorithm output (IAO) dataset. In embodiments, the absolute distance between the imputer algorithm output (IAO) datasets are compared with the artificial missing point, indicated at 1035. The imputer algorithm that produced the data point that is closest to the artificial missing point is deemed to be the best imputer algorithm for that specific incomplete data range. In this example, the first imputer algorithm has its data point 1026 closest to the artificial missing point, indicated at 1035, and thus, the first imputer algorithm is the best for this particular incomplete data set. Other incomplete data ranges within that dataset may benefit from using a different imputer algorithm, based on the analysis provided by disclosed embodiments.

Figure 11:
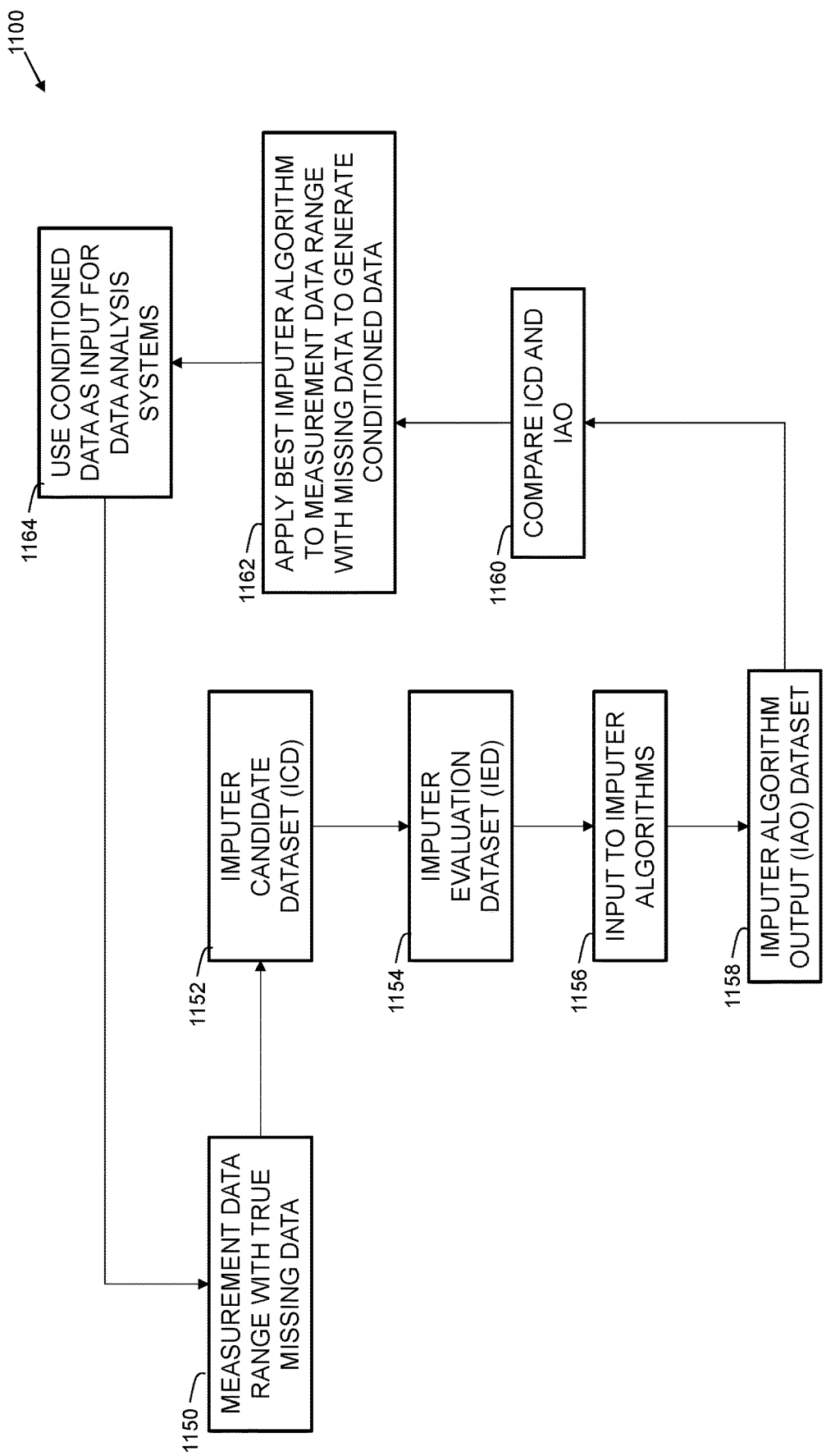
FIG. 11 is a flowchart showing derivation and use of conditioned data in accordance with embodiments of the present invention.

FIG. 11 is a flowchart 1100 showing derivation and use of conditioned data in accordance with embodiments of the present invention. At 1150, a measurement data range with true missing data is obtained. At 1152, an imputer candidate dataset (ICD) is obtained. At 1154, an imputer evaluation dataset (IED) is created from the ICD by removing one or more data points to create artificial missings. At 1156, the IED is input to the imputer algorithms. Each imputer algorithm generates an imputer algorithm output (IAO) dataset at 1158. At 1160, the IAO for each imputer algorithm is compared to the ICD. At 1162, the best imputer algorithm, which is the imputer algorithm that most closely approximates the ICD, is applied to the measurement data range with missing data to generate conditioned data. At 1164, the conditioned data is used as input for data analysis systems, such as machine learning system 258 and/or numerical analysis system 264. This enables the data analysis systems to operate with more complete and representative input data, potentially improving the output efficacy. After 1164, the process can then return to 1150 to repeat the process on a new data range that includes missing data. When the process continues to 1162, it may select a new imputer algorithm to fill in the missing data points, or select a previously-used algorithm, depending on the evaluation of the imputer algorithms. In this way, the best imputer algorithm is applied to each data range, rather than using a one-size-fits-all approach.

Figure 12:
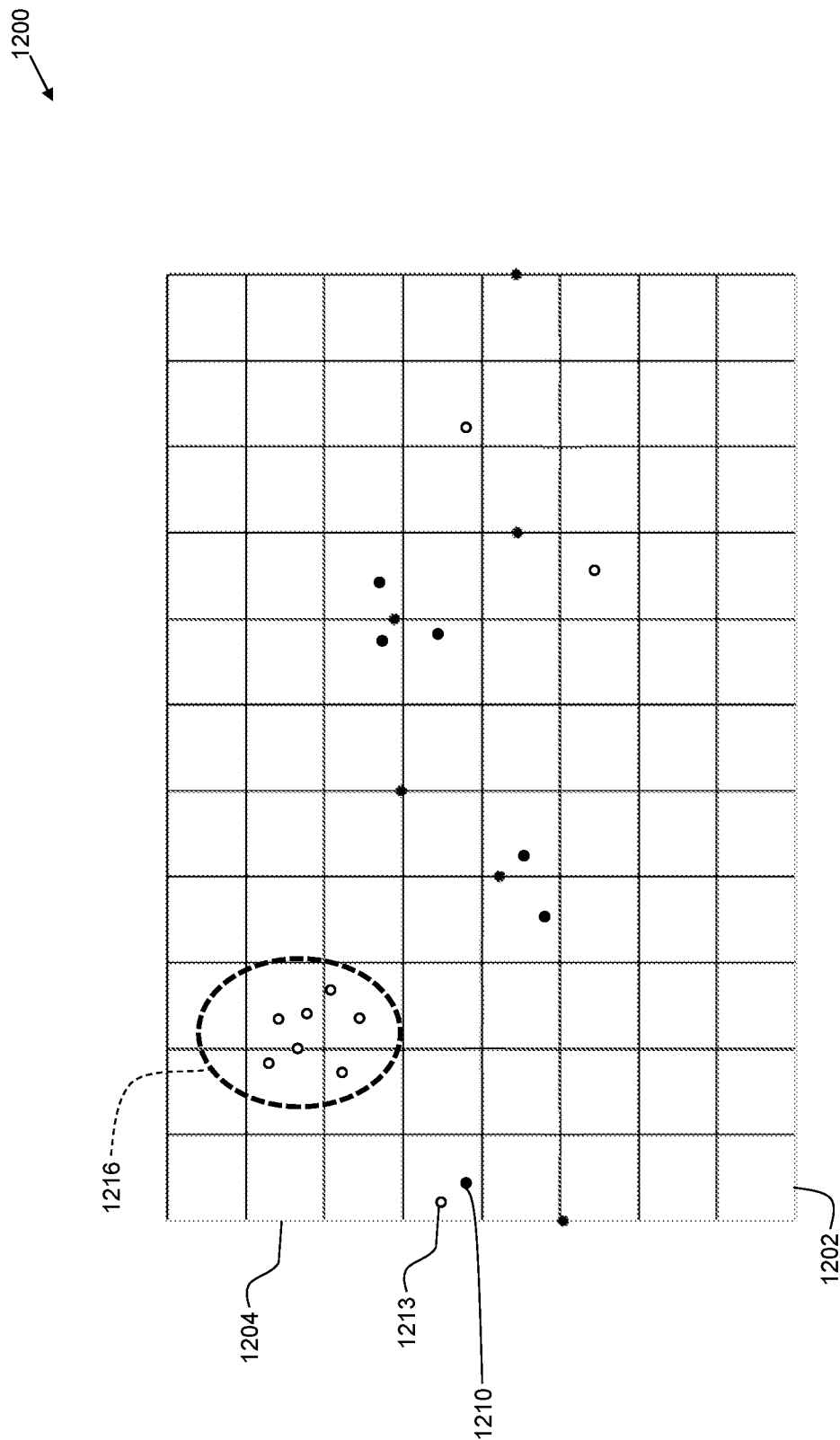
FIG. 12 shows an example of multiple missing points in a neighborhood.

FIG. 12 is a graph 1200 that shows an example of multiple missing points in a neighborhood. In a mathematical sense, if S is a topological space, and p is a point in X, then a neighborhood of p is a subset V of X that includes an open set U containing p such that:

$$p \in U \subseteq V \subseteq S$$

The graph 1200 includes a horizontal axis 1202, and vertical axis 1204. In this example, the horizontal axis 1202 can represent distance in an east-west direction, and the vertical axis 1204 can represent distance in a north-south direction. Thus, the data points shown in FIG. 12 can be spatially related. Data points are indicated generally as 1210 (as a dark circle). The missing data points are indicated generally as 1213 (white-filled circle). The missing data points can be representations of IoT sensors that have a known position, but failed to report any data, and thus, are categorized as a missing. In embodiments, there can be a neighborhood 1216 that contains multiple missing points. The neighborhood represents a collection of proximal missing points in X-Y space. In a deployed system, this cluster of missing data points can be caused by a localized condition such as a network outage and/or power outage. In embodiments, the multiple missing points are selected from a neighborhood.

As can now be appreciated, disclosed embodiments provide techniques for evaluating imputer algorithm performance on given incomplete data ranges. Disclosed embodiments utilize an artificial missing data point, of which the true value is known. The artificial missing data point is part of a data set that is mathematically similar to a data set that contains a true missing data point. Since the actual value of the artificial missing data point is known, imputer algorithms can be accurately evaluated by operating on data that contains the artificial missing(s). The imputer algorithm that provides the best estimate for the artificial missing(s) is likely to also have good performance on data sets that contain true missing data (the actual values are unknown). In this way, disclosed embodiments improve the technical field of data management, including sensor data management, improving the quality of data input and the accuracy of data output.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of facilitating processing within a computing environment, the method, comprising:
   providing a data gap mitigation system to interact with other components of the computing environment across a network, the data gap mitigation system to enhance data quality for a machine learning system of the computing environment;
   operatively connecting the data gap mitigation system to the network, and to the machine learning system across the network;
   receiving configuration data at the data gap mitigation system across the network from a client device;
   running the data gap mitigation system using the configuration data to enhance a measurement dataset obtained from one or more sensors, the running the data gap mitigation system comprising:
      executing each imputer algorithm of a plurality of imputer algorithms specified in the configuration data received from the client device, the executing including for each imputer algorithm:
         applying the executing imputer algorithm to an imputer evaluation dataset (IED) to obtain an imputer algorithm output (IAO) dataset, the imputer evaluation dataset having been obtained from an imputer candidate dataset (ICD) by removing known values from the imputer candidate dataset, the imputer candidate dataset including a complete dataset that is representative of a data range, the data range being within the measurement dataset and being incomplete;
         generating an imputer evaluation metric for the executing imputer algorithm based on a comparison between the imputer candidate dataset (ICD) and the imputer algorithm output (IAO) dataset;
      ranking each executed imputer algorithm of the plurality of imputer algorithms based on the imputer evaluation metric of each executed imputer algorithm; and
      generating a complete data range by executing a highest ranked imputer algorithm of the plurality of imputer algorithms with the data range to provide the machine learning system of the computing environment with a complete data range for enhanced data analysis; and
      sending the complete data range across the network to the machine learning system to apply the complete data range to the machine learning system to enhance output data quality of the machine learning system from the measurement dataset obtained from the one or more sensors.

2. The method of claim 1, wherein the imputer candidate dataset comprises a second data range within the measurement dataset.

3. The method of claim 1, wherein the imputer candidate dataset is comprised of synthesized data.

4. The method of claim 1, wherein the executing each imputer algorithm further comprises estimating missing datapoints within the data range prior to determining a similarity metric between the imputer candidate dataset and the incomplete data range.

5. The method of claim 1, wherein generating the imputer evaluation metric comprises determining a mean.

6. The method of claim 1, wherein generating the imputer evaluation metric comprises determining a mean square error.

7. The method of claim 1, wherein generating the imputer evaluation metric comprises determining a mean absolute error.

8. The method of claim 1, wherein the data gap mitigation system further identifies the data range as comprising a data range with one missing point.

9. The method of claim 1, wherein the data gap mitigation system further identifies the data range as comprising a data range with multiple missing points.

10. The method of claim 9, wherein the multiple missing points are selected from a neighborhood.

11. The method of claim 1, wherein the executing each imputer algorithm further comprises performing a feature selection process to predict values of missing data points prior to determining a similarity metric between the imputer candidate dataset and the incomplete data range.

12. The method of claim 11, wherein the feature selection process includes shape identification of a graph of the incomplete data range.

13. The method of claim 12, wherein the shape identification includes identifying a shape selected from the group consisting of a monotonically increasing shape and a monotonically decreasing shape.

14. The method of claim 12, wherein the shape identification includes identifying a shape selected from the group consisting of a local minimum and a local maximum.

15. The method of claim 3, wherein the executing each imputer algorithm further comprises determining the imputer candidate dataset using a process selected from the group consisting of a Gaussian process and a Poisson process.

16. A computing environment comprising:
a data gap mitigation system to interact with other components of the computing environment across a network, the data gap mitigation system enhancing data quality for a machine learning system of the computing environment, the data gap mitigation system comprising:
a processor;
a memory coupled to the processor, the memory containing instructions, that when executed by the processor, cause the data gap mitigation system to:
operatively connect to the network and to the machine learning system across the network;
receive configuration data across the network from a client device;
run using the configuration data to enhance a measurement dataset obtained from one or more sensors, the running of the data gap mitigation system to:
determine a similarity metric between a data range and an imputer candidate dataset (ICD) by removing known values from the imputer candidate dataset, the imputer candidate dataset including a complete data set that is representative of the data range, the data range being within the measurement dataset and being incomplete;
based on the similarity metric exceeding a predetermined threshold:
generating an imputer evaluation dataset (IED) from the imputer candidate dataset;
executing each imputer algorithm of a plurality of imputer algorithms specified in the configuration data received from the client device, the executing including for each imputer algorithm:
applying the executing imputer algorithm to the imputer evaluation dataset to obtain an imputer algorithm output (IAO) dataset;
generating an imputer evaluation metric for the executing imputer algorithm based on a comparison between the imputer candidate dataset (ICD) and the imputer algorithm output dataset;
ranking each executed imputer algorithm of the plurality of imputer algorithms based on the imputer evaluation metric of each executed imputer algorithm;
generate a complete data range by executing a highest ranked imputer algorithm of the plurality of imputer algorithms with the data range to provide the machine learning system of the computing environment with a complete data range for enhanced data analysis; and
send the complete data range across the network to the machine learning system to apply the completed data range to the machine learning system to enhance output data quality of the machine learning system from the measurement dataset obtained from the one or more sensors.

17. The computing environment of claim 16, wherein the executing each imputer algorithm further comprises estimating missing datapoints within the data range prior to determining the similarity metric.

18. The computing environment device of claim 16, wherein the executing each imputer algorithm further comprises performing a feature selection process to predict values of missing data points prior to determining the similarity metric.

19. A computer program product for a data gap mitigation system to enhance data quality for a machine learning system of a computing environment, the data gap mitigation system interacting with other components of the computing environment across a network, including the machine learning system, the computer program product comprising a computer readable storage medium having program instructions embodied therewith, the program instructions being executable by a processor to cause the data gap mitigation system to:
operatively connect to the network and to the machine learning system across the network;
receive configuration data across the network from a client device;
run using the configuration data to enhance a measurement dataset obtained from one or more sensors, the running of the data gap mitigation system to:
determine a similarity metric between a data range and an imputer candidate dataset (ICD) by removing known values from the imputer candidate dataset, the imputer candidate dataset including a complete dataset that is representative of the data range, the data range being within the measurement dataset and being incomplete;
based on the similarity metric exceeding a predetermined threshold:
generating an imputer evaluation dataset (IED) from the imputer candidate set;
executing each imputer algorithm of a plurality of imputer algorithms specified in the configuration data received from the client device, the executing including for each imputer algorithm:
applying the executing imputer algorithm to the imputer evaluation dataset to obtain an imputer algorithm output (IAO) dataset;
generating an imputer evaluation metric for the executing imputer algorithm based on a comparison between the imputer candidate set and the imputer algorithm output dataset;
ranking each executed imputer algorithm of the plurality of imputer algorithms based on the imputer evaluation metric of each executed imputer algorithm;
generate a complete data range by executing a highest ranked imputer algorithm of the plurality of imputer algorithms with the data range to provide the machine learning system of the computing environment with a complete data range for enhanced data analysis; and
send the complete data range across the network to the machine learning system to apply the completed data range to the machine learning system to enhance output data quality of the machine learning system from the measurement dataset obtained from the one or more sensors.

20. The computer program product of claim 19, wherein the executing each imputer algorithm further comprises estimating missing datapoints within the data range prior to determining the similarity metric.

\* \* \* \* \*